UNITED STATES PATENT OFFICE.

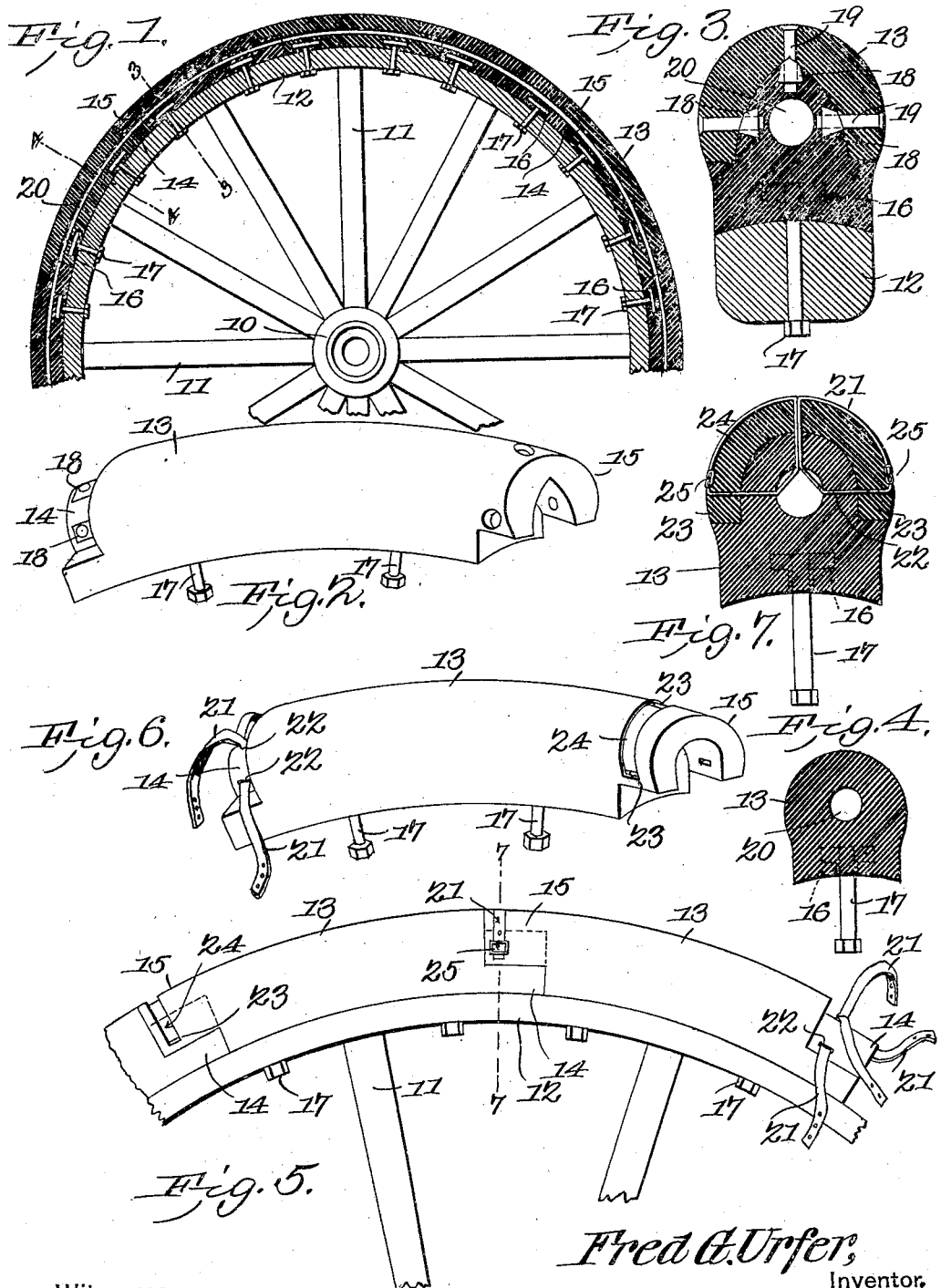

FRED GODFREY URFER, OF PORTLAND, OREGON.

SECTIONAL TIRE.

No. 814,175.  Specification of Letters Patent.  Patented March 6, 1906.

Application filed August 22, 1905. Serial No. 275,301.

*To all whom it may concern:*

Be it known that I, FRED GODFREY URFER, a citizen of the United States, residing at Portland, in the county of Multnomah and State of Oregon, have invented a new and useful Sectional Tire, of which the following is a specification.

This invention relates to the tires of vehicles, and has for its object to provide a simply-constructed device of this character from a plurality of separable sections, preferably of rubber or like material, which when arranged around a wheel-felly and connected thereto form a complete yieldable tire, one or more of which may be detached when worn or broken and replaced by a perfect member without disturbing the remaining members.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings, Figure 1 is a side elevation, partly in section, of a portion of vehicle-wheel with the improved sectional tire applied. Fig. 2 is a perspective view, enlarged, of one of the tire-sections detached. Fig. 3 is a transverse section, enlarged, on the line 3 3 of Fig. 1. Fig. 4 is a transverse section, enlarged, on the line 4 4 of Fig. 1 and on a smaller scale than Fig. 3. Fig. 5 is a view of a portion of a wheel-rim and a section of the improved tire, illustrating a modified construction. Fig. 6 is a perspective view, detached, of one of the tire-sections embodying the modified structure shown in Fig. 5. Fig. 7 is a transverse section, enlarged, on the line 7 7 of Fig. 5.

The improved device may be applied to any of the various forms of wheels which require rubber or similar yielding tires, and for the purpose of illustration the improved device is shown applied to an approved wheel structure in which is shown the hub 10, spokes 11, and felly 12 of the ordinary construction.

The improved device comprises a plurality of tire-sections 13, of suitable yieldable material, such as rubber, of the consistency usually employed for tire purposes and arranged end to end around the felly and securely fastened thereto and to each other. The sections are reversely "scarfed," as at 14 15, the scarfed portions 14 of each section underlapping the scarfed portion 15 of an adjacent outer section and forming a continuous tire around the felly. Embedded in the inner sides of the sections 13 are spaced nuts 16, into which clamp-bolts 17 operate after passing through the felly 12, as shown, and by which means the sections are firmly connected to the felly and at the same time are easily detachable therefrom when required by merely releasing the bolts. Embedded in the scarfed portions 14 of the tire-sections are nuts 18, in which bolts 19 operate through the scarfed portions 15, the scarfed portions of the tire being thus firmly clamped in place. By this means the tire-sections are firmly united and a complete and durable tire produced, while at the same time one or more of the sections may be detached when worn or broken and replaced by a new section and without disturbing the remaining sections. Thus by supplying each vehicle with an extra supply of the tire-sections in event of the breakage or wearing of one or more of the sections attached to the felly repairs can be very quickly made by any person. The sections 13 are also each preferably formed with a longitudinal aperture 20, which register when the sections are disposed in position upon the felly, and thus form a continuous opening within the tire, as represented in Fig. 1, to increase the resiliency or "cushioning" action of the tire.

In Figs. 5, 6, and 7 are shown some slight modifications in the manner of coupling the scarfed ends of the tire-sections, consisting in substituting binding-straps 21 for the clamp-bolts 19 and embedded nuts 18, the straps arranged to pass through apertures 22 23, formed, respectively, in scarfed portions 14 15 and to be embedded in recesses 24 in the outer faces of the portions 15 and extending between the apertures, so that no portion of the straps extends above the general surface of the sections. The ends of the straps 21 are connected by buckles 25 or other suitable fastening means, the buckles being also embedded in the recesses 24. The strap-fastening means may be employed for some forms of wheels or for wheels employed upon some forms of vehicles, while the binding-bolts will be preferable for others.

Having thus described the invention, what is claimed is—

1. In combination, a tire formed of a plurality of sections having scarfed ends arranged to overlap on lines parallel with the peripheral line of the wheel-felly, means for securing each section independently to the wheel, and means for connecting the scarfed portions of the sections to each other.

2. A wheel-tire formed of a plurality of tubular sections having scarfed ends arranged to overlap, means for securing the sections to the felly of a wheel, and means for securing the scarfed ends of the sections to each other.

3. A wheel-tire formed of a plurality of tubular sections, the ends of said sections being scarfed on lines parallel with the inner and tread faces of the tire and arranged to overlap, means for securing the independent sections in place, and means for securing the scarfed ends of the sections to each other.

4. A wheel-tire formed of a plurality of tubular sections, nuts embedded in the inner faces of said sections and arranged for the reception of securing-bolts, the opposite ends of each section being scarfed on lines parallel with the inner and tread surfaces of the tire, and means for securing said scarfed sections to each other.

5. A wheel-tire formed of a plurality of sections having scarfed overlapping ends, nuts embedded in the inner scarfed portion, and bolts extending through the outer scarfed portion and into said nuts.

In testimony that I claim the foregoing as my own I have hereto affixed my signature in the presence of two witnesses.

FRED GODFREY URFER.

Witnesses:
 ALEX. BERNSTEIN,
 D. SOLIS COHEN.